(12) United States Patent
Ueki et al.

(10) Patent No.: US 10,059,831 B2
(45) Date of Patent: Aug. 28, 2018

(54) CARBON FIBER COMPOSITE MATERIAL, AND METHOD FOR PRODUCING CARBON FIBER COMPOSITE MATERIAL

(71) Applicants: NISSIN KOGYO CO., LTD., Ueda-shi, Nagano (JP); SHINSHU UNIVERSITY, Matsumoto-shi, Nagano (JP)

(72) Inventors: Hiroyuki Ueki, Nagano (JP); Toru Noguchi, Nagano (JP)

(73) Assignees: NISSIN KOGYO CO., LTD., Ueda (JP); SHINSHU UNIVERSITY, Matsumoto (JP)

( * ) Notice: Subject to any disclaimer, the term of this patent is extended or adjusted under 35 U.S.C. 154(b) by 63 days.

(21) Appl. No.: 14/443,164

(22) PCT Filed: Dec. 3, 2013

(86) PCT No.: PCT/JP2013/082491
§ 371 (c)(1),
(2) Date: May 15, 2015

(87) PCT Pub. No.: WO2014/088005
PCT Pub. Date: Jun. 12, 2014

(65) Prior Publication Data
US 2015/0329705 A1    Nov. 19, 2015

(30) Foreign Application Priority Data

Dec. 4, 2012  (JP) .................. 2012-264939

(51) Int. Cl.
| | |
|---|---|
| C08K 7/06 | (2006.01) |
| C08K 3/04 | (2006.01) |
| C08L 101/00 | (2006.01) |
| C08J 5/00 | (2006.01) |
| C08K 7/24 | (2006.01) |
| B82Y 30/00 | (2011.01) |

(52) U.S. Cl.
CPC .............. *C08K 7/06* (2013.01); *C08J 5/005* (2013.01); *C08K 3/04* (2013.01); *C08K 7/24* (2013.01); *C08L 101/00* (2013.01); *B82Y 30/00* (2013.01); *C08K 2201/002* (2013.01); *C08K 2201/011* (2013.01); *C08K 2201/014* (2013.01)

(58) Field of Classification Search
CPC ... C08J 5/005; C08K 3/04; C08K 7/06; C08K 7/24; C08K 2201/002; C08K 2201/011; C08K 2201/014; C08K 3/041; C08L 101/00; B82Y 30/00
See application file for complete search history.

(56) References Cited

U.S. PATENT DOCUMENTS

| | | |
|---|---|---|
| 2004/0241440 A1 | 12/2004 | Noguchi et al. |
| 2009/0166918 A1 | 7/2009 | Noguchi et al. |
| 2009/0306270 A1 | 12/2009 | Noguchi et al. |
| 2010/0234514 A1 | 9/2010 | Noguchi et al. |
| 2010/0279099 A1 | 11/2010 | Noguchi et al. |
| 2011/0156357 A1* | 6/2011 | Noguchi .............. C09K 3/1009 277/336 |

FOREIGN PATENT DOCUMENTS

| | | |
|---|---|---|
| EP | 1 738 892 A1 | 1/2007 |
| JP | 2005-097525 A | 4/2005 |
| JP | 2006-291230 A | 10/2006 |
| JP | 2007-039648 A | 2/2007 |
| JP | 2007-039649 A | 2/2007 |
| JP | 2007-273283 | 10/2007 |
| JP | 2012-224814 A | 11/2012 |

OTHER PUBLICATIONS

Mar. 11, 2014 Search Report issued in International Patent Application No. PCT/JP2013/082491.
Takeuchi, Kenji et al., "Swelling and Interface Analysis of Multi-walled Carbon Nanotube/Natural Rubber Composite", Carbon TANSO 2010, No. 244, 147-152.
Jul. 8, 2016 Extended European Search Report issued in European Application No. 13859628.3.

* cited by examiner

*Primary Examiner* — Irina S Zemel
(74) *Attorney, Agent, or Firm* — Oliff PLC

(57) ABSTRACT

A carbon fiber composite material of the present invention includes: cell structures with an elastomer surrounded by a first carbon nanofiber and an interface phase thereof; cell structure assemblies as assemblies of more than one of the cell structures; and tie structures that join the cell structure assemblies to each other. The tie structures are formed by one or more first carbon nanofibers, one or more second carbon nanofibers, and the elastomer interface phase surrounding the one or more first carbon nanofibers and the one or more second carbon nanofibers.

9 Claims, 4 Drawing Sheets

CARBON FIBER COMPOSITE MATERIAL, AND METHOD FOR PRODUCING CARBON FIBER COMPOSITE MATERIAL

TECHNICAL FIELD

The present invention relates to a carbon fiber composite material that contains carbon nanofibers, and to a method for producing such carbon fiber composite materials.

BACKGROUND ART

Carbon nanofibers easily aggregate, and cannot be easily defibrated and uniformly dispersed in a matrix such as an elastomer. As a countermeasure, an innovative carbon fiber composite material producing method has been proposed that takes advantage of the elasticity and viscosity of the elastomer, and the chemical interaction of the elastomer with the carbon nanofibers to defibrate and uniformly disperse the aggregated carbon nanofibers in the elastomer under a strong shear force applied to the elastomer (see, for example, JP-A-2005-97525).

It has been found from the examination of composite materials of multi-walled carbon nanotubes and natural rubber in an immersion solvent that single fibers of defibrated and uniformly dispersed multi-walled carbon nanotubes form a continuous spatial structure (cellulation) at a filling rate of 16 mass % or more (see, for example, *Swelling and Interface Analysis of Multi-walled Carbon Nanotube/Natural Rubber Composite*, Carbon TANSO 2010, No. 244, 147-152). It has been revealed that such a continuous spatial structure occurs in the interface phase between the multi-walled carbon nanotube and the rubber binding to the multi-walled carbon nanotube surface, and has a high elastic modulus and a high heat resistance. However, using large quantities of multi-walled carbon nanotubes works against processibility, and tends to increase cost.

It has been proposed to mix appropriate amounts of carbon nanofiber and carbon black with an elastomer to produce a stable carbon fiber composite material that undergoes only small thermal expansion over a wide temperature range (see, for example, JP-A-2007-39649). The amount of expensive carbon nanofiber in such a carbon fiber composite material can be reduced because the carbon nanofiber and the carbon black work together to form a continuous spatial structure.

SUMMARY OF INVENTION

Technical Problem

It is an object of the present invention to provide a carbon fiber composite material that uses carbon nanofibers, and a method for producing such carbon fiber composite materials.

Solution to Problem (1) A carbon fiber composite material according to the present invention includes:

a plurality of cell structures with an elastomer surrounded by a first carbon nanofiber and an interface phase thereof;

a plurality of cell structure assemblies as assemblies of more than one of the cell structures; and a plurality of tie structures that joins the cell structure assemblies to each other, wherein the tie structures are formed by one or more first carbon nanofibers, one or more second carbon nanofibers, and an elastomer interface phase formed around the one or more first carbon nanofibers and the one or more second carbon nanofibers.

With the carbon fiber composite material according to the present invention, the reinforcement by the first and second carbon nanofibers enables providing a carbon fiber composite material having high strength and high rigidity with the maintained flexibility. It is also possible with the carbon fiber composite material according to the present invention to provide a composite material of an elastomer and first and second carbon nanofibers having high heat resistance, flexibility and abrasion resistance.

(2) In the carbon fiber composite material of (1), the first carbon nanofibers may have an average diameter of 0.5 nm to 500 nm, the cell structure assemblies may have an average diameter of 0.02 µm to 30 µm, and the tie structures may have an average diameter of 5 nm to 10 µm.

(3) In the carbon fiber composite material of (1) or (2), the first carbon nanofibers may have an average diameter of 0.5 nm to 40 nm, and may be contained in an amount of 5 parts by mass to 40 parts by mass with respect to 100 parts by mass of the elastomer, and the second carbon nanofibers may have an average diameter of 60 nm to 100 nm.

(4) In the carbon fiber composite material of (3), the cell structure assemblies may have an average diameter of 0.02 µm to 2 µm, and the tie structures may have an average diameter of 65 nm to 2 µm.

(5) In the carbon fiber composite material of (1) or (2), the first carbon nanofibers may have an average diameter of 60 nm to 100 nm, and may be contained in an amount of 20 parts by mass to 60 parts by mass with respect to 100 parts by mass of the elastomer, and the second carbon nanofibers may have an average diameter of 0.5 nm to 40 nm.

(6) In the carbon fiber composite material of (5), the cell structure assemblies may have an average diameter of 3 µm to 10 µm, and the tie structures may have an average diameter of 65 nm to 2 µm.

(7) A method for producing a carbon fiber composite material according to the present invention includes the steps of:

(a) mixing a first carbon nanofiber with an elastomer, and tight-milling the mixture at 0° C. to 50° C. by using open rolls at a roll distance of 0.5 mm or less to obtain a composite elastomer; and (b) mixing the composite elastomer with a second carbon nanofiber, and tight-milling the mixture at 0° C. to 50° C. by using open rolls at a roll distance of 0.5 mm or less to obtain the carbon fiber composite material.

With the carbon fiber composite material producing method according to the present invention, it is possible to provide a carbon fiber composite material having high strength and high rigidity with the maintained flexibility. With the carbon fiber composite material producing method according to the present invention, the reinforcement by the carbon nanofibers enables providing a carbon fiber composite material having high heat resistance, flexibility and abrasion resistance.

(8) In the method of (7), the first carbon nanofiber mixed in the step (a) may have an average diameter of 0.5 nm to 40 nm, and may be mixed in an amount of 5 parts by mass to 40 parts by mass with respect to 100 parts by mass of the elastomer, and the second carbon nanofiber mixed in the step (b) may have an average diameter of 60 nm to 100 nm.

(9) In the method of (7), the first carbon nanofiber mixed in the step (a) may have an average diameter of 60 nm to 100 nm, and may be mixed in an amount of 20 parts by mass to 60 parts by mass with respect to 100 parts by mass of the elastomer, and the second carbon nanofiber mixed in the step (b) may have an average diameter of 0.5 nm to 40 nm.

DESCRIPTION OF EMBODIMENTS

An embodiment of the present invention is described below in detail with reference to the accompanying drawings.

A carbon fiber composite material according to an embodiment of the present invention includes:

a plurality of cell structures with an elastomer surrounded by a first carbon nanofiber and an interface phase thereof;

a plurality of cell structure assemblies as assemblies of more than one of the cell structures; and a plurality of tie structures that joins the cell structure assemblies to each other, wherein the tie structures are formed by one or more first carbon nanofibers, one or more second carbon nanofibers, and an elastomer interface phase formed around the one or more first carbon nanofibers and the one or more second carbon nanofibers.

A method for producing a carbon fiber composite material according to an embodiment of the present invention includes the steps of:

(a) mixing a first carbon nanofiber with an elastomer, and tight-milling the mixture at 0° C. to 50° C. by using open rolls at a roll distance of 0.5 mm or less to obtain a composite elastomer; and (b) mixing the composite elastomer with a second carbon nanofiber, and tight-milling the mixture at 0° C. to 50° C. by using open rolls at a roll distance of 0.5 mm or less to obtain the carbon fiber composite material.

A. Carbon Fiber Composite Material Producing Method

Figure 1:
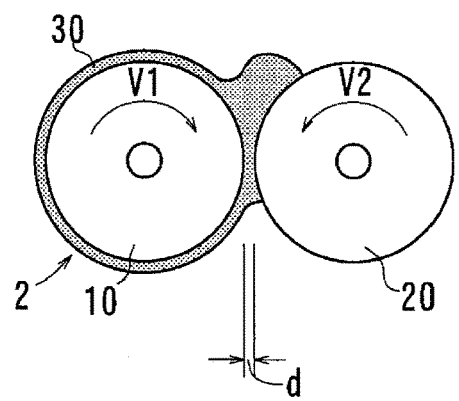
FIG. 1 is a diagram schematically representing step (a).
Figure 2:
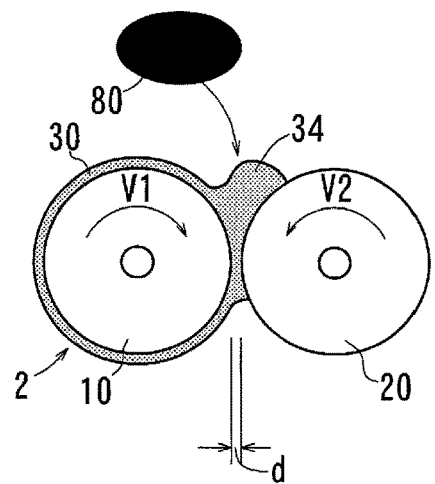
FIG. 2 is a diagram schematically representing step (a).
Figure 3:
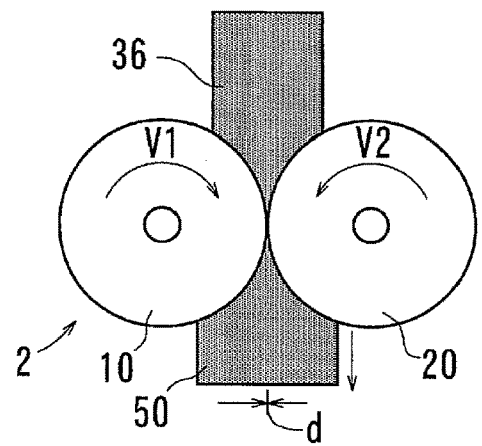
FIG. 3 is a diagram schematically representing step (a).
Figure 4:
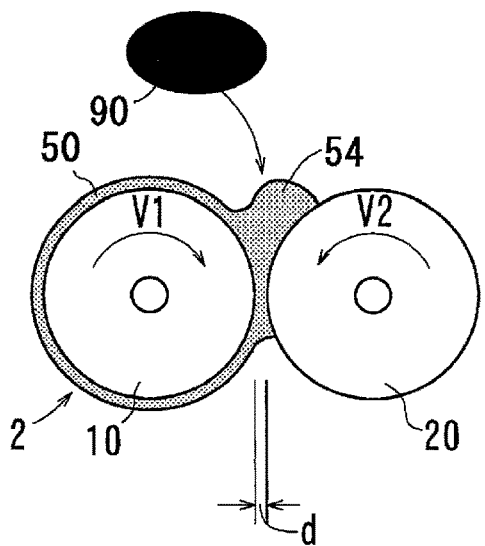
FIG. 4 is a diagram schematically representing step (b).
Figure 5:
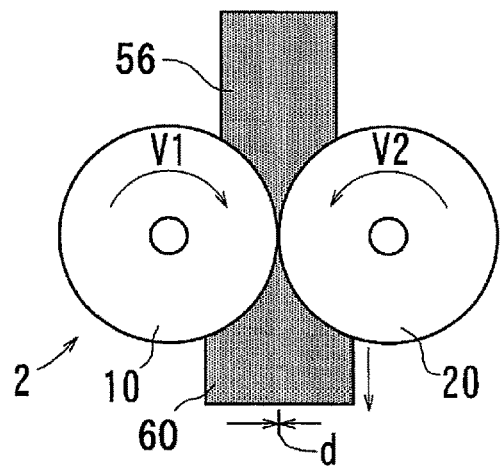
FIG. 5 is a diagram schematically representing step (b).
Figure 6:
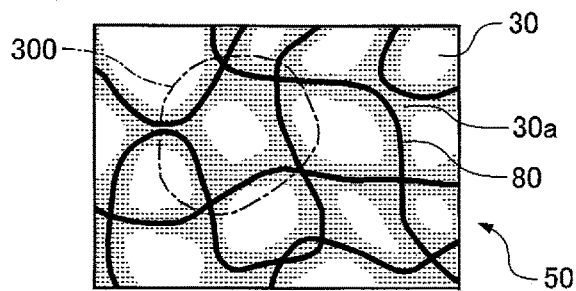
FIG. 6 is a diagram schematically representing the cell structure.
Figure 7:
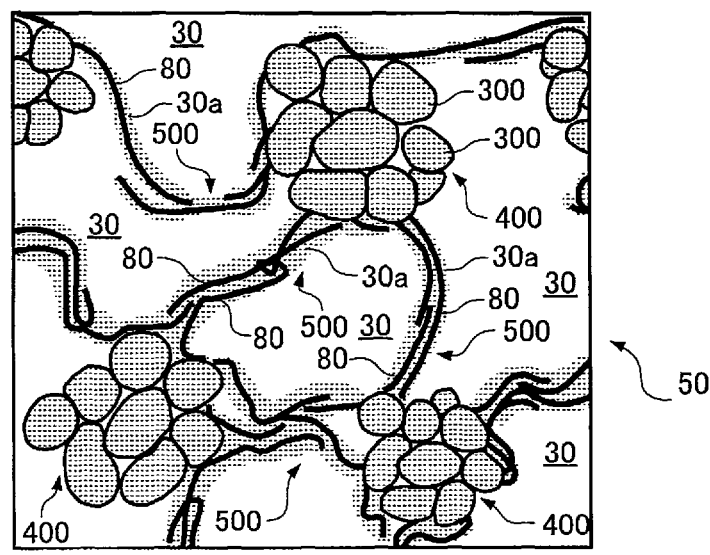
FIG. 7 is a diagram schematically representing the cell-tie structure.
Figure 8:
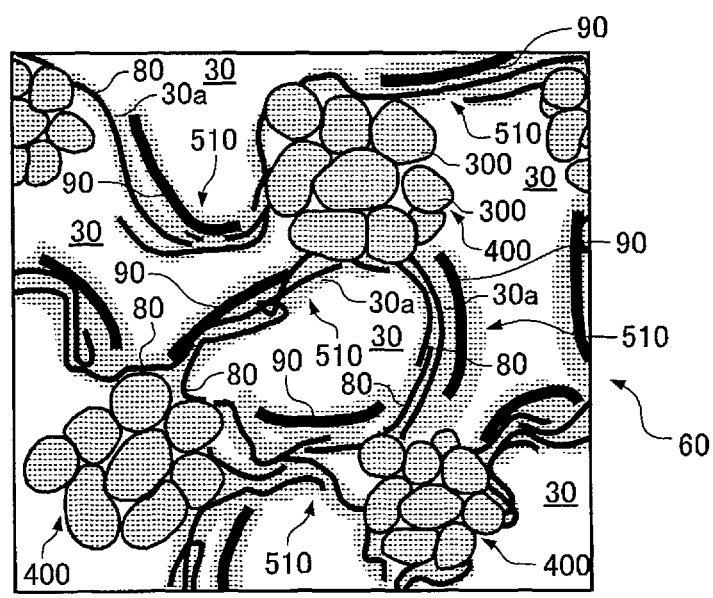
FIG. 8 is a diagram schematically representing the cell-tie structure of a carbon fiber composite material of an embodiment of the invention.

FIGS. 1 to 3 are diagrams schematically representing the step (a) of the carbon fiber composite material producing method according to the embodiment. FIGS. 4 to 5 are diagrams schematically representing the step (b) of the carbon fiber composite material producing method according to the embodiment. FIG. 6 is a diagram schematically representing the cell structure. FIG. 7 is a diagram schematically representing the cell-tie structure. FIG. 8 is a diagram schematically representing the cell-tie structure of the carbon fiber composite material according to the embodiment.

A-1. Step (a)

The step of mixing the first carbon nanofiber with the elastomer in step (a) may be performed, for example, with two open rolls 2 as shown in FIGS. 1 to 3. The open rolls 2 include a first roll 10 and a second roll 20. The first roll 10 and the second roll 20 are separated from each other with a predetermined distance d of, for example, 0.5 mm to 1.5 mm, and rotate at rotational speeds V1 and V2 in the forward or reverse direction indicated by arrow in the figure.

As shown in FIG. 1, an elastomer 30 wound around the first roll 10 is masticated to appropriately cut the elastomer molecular chain and generate free radicals. The mastication creates a state where the generated free radicals of the elastomer easily bind to the first carbon nanofiber.

Thereafter, as shown in FIG. 2, a plurality of first carbon nanofibers 80 is supplied to a bank 34 of the elastomer 30 wound around the first roll 10, and mixed therewith to obtain a first mixture 36. The method used to obtain the first mixture 36 of FIGS. 1 to 2 in step (a) is not limited to the open-roll method, and may be, for example, an internal mixing method, or a multi-screw extrusion kneading method.

Next, as shown in FIG. 3, a composite elastomer is obtained by tight-milling the mixture at 0° C. to 50° C. with the open rolls after setting the roll distance to 0.5 mm or less for step (a). In this step, the roll distance d between the first roll 10 and the second roll 20 may be set to, for example, 0.5 mm or less, more preferably 0 to 0.5 mm, and the first mixture 36 obtained in FIG. 2 may be supplied between the open rolls 2, and tight-milled one or more times, for example, about 1 to 10 times. The surface velocity ratio (V1/V2) of the first roll 10 and the second roll 20 for the tight-milling may be 1.05 to 3.00, preferably 1.05 to 1.2, where V1 is the surface velocity of the first roll 10, and V2 is the surface velocity of the second roll 20. A desired shear force can be obtained with such a surface velocity ratio. A composite elastomer 50 extruded through the narrow space between the rolls undergoes large deformation under the restoring force of the elastic elastomer as shown in FIG. 3, and moves the first carbon nanofibers by large amounts with the elastomer. The tight-milled composite elastomer 50 is rolled into a form of a sheet of a predetermined thickness, for example, 100 μm to 500 μm. In order to make the shear force as high as possible, the tight-milling step may be performed at a roll temperature of, for example, 0 to 50° C., or at a relatively low temperature of 5 to 30° C. The measured elastomer temperature may be adjusted to 0 to 50° C., or 5 to 30° C. In these adjusted temperature ranges, the first carbon nanofibers can be dispersed by taking advantage of the elasticity of the elastomer. The high shear force acts on the elastomer, and the aggregated first carbon nanofibers are separated from each other, and become dispersed in the elastomer by being removed one by one by the elastomer molecules. Specifically, the first carbon nanofibers can be easily defibrated and dispersed by taking advantage of the elasticity and the viscosity of the elastomer, and the chemical interaction of the elastomer with the first carbon nanofibers. This makes it possible to obtain the composite elastomer 50 that has excellent first carbon nanofiber dispersibility, and excellent dispersion stability (the first carbon nanofibers rarely reaggregate).

To be more specific, the viscous elastomer enters the space between the first carbon nanofibers, and specific portions of the elastomer molecules bind to high activity sites of the first carbon nanofibers through chemical interaction upon mixing the elastomer and first carbon nanofibers with the open rolls. The binding of the first carbon nanofibers with the elastomer molecules can more easily take place when the first carbon nanofiber surface has moderately high activity after, for example, an oxidation treatment. Upon application of a strong shear force to the elastomer, the first carbon nanofibers move along the movement of the elastomer molecules, and are separated from the aggregates and dispersed in the elastomer under the restoring force of the elastic elastomer subjected to the shear. The open-roll method is particularly preferred because it allows for not only controlling the roll temperature but measuring and controlling the actual temperature of the mixture.

A-2. Composite Elastomer

As illustrated in FIG. 6, the composite elastomer 50 includes large numbers of cell structures 300 with the elastomer 30 surrounded by the first carbon nanofibers 80 and an interface phase 30a thereof. The interface phase 30a can be thought of as a bound rubber, formed around the first carbon nanofibers 80, including the interface between the elastomer 30 and the first carbon nanofibers 80. The bound rubber is a high molecular chain that is under the influence of the molecular mobility due to the interaction between the carbon black and the elastomer formed around the carbon black occurring upon mixing the reinforcing material carbon black with the elastomer. The elastomer 30 elutes when the composite elastomer 50 in uncrosslinked form is dipped in a solvent, for example, such as toluene, and the interface phase 30a can thus be also defined as a portion of the elastomer remaining around the first carbon nanofibers.

FIG. 6 is a two-dimensional representation of the cell structure 300. However, the interface phase 30a actually forms a continuous spatial structure of a three-dimensional network, and surrounds portions of the elastomer 30 that have small effects on the first carbon nanofibers 80. The size of the cell structure 300 can be controlled by varying the average diameter of the first carbon nanofibers 80, though the size also depends on the content of the first carbon nanofibers 80. Specifically, increasing the average diameter of the first carbon nanofibers 80 increases the cell structure 300, and decreasing the average diameter of the first carbon nanofibers 80 decreases the cell structure 300.

It has been found from previous studies that the maximum diameter of a single cell structure 300 is about 2 to 10 times the average diameter of the first carbon nanofibers 80.

As illustrated in FIG. 7, in the composite elastomer 50 containing the first carbon nanofibers 80 in a practical proportion (a proportion that does not make the hardness excessively high), the cell structures 300 do not occur uniformly throughout the composite elastomer 50 but rather aggregate and form a plurality of cell structure assemblies 400 that resemble islands on the sea. The structure shown in FIG. 6 is a magnified view of the cell structure assemblies 400 shown in FIG. 7. The first carbon nanofibers 80 joining the adjacent cell structure assemblies 400 to each other, and the interface phase 30a form a tie (tie) structure 500. The tie structure 500, appearing like a strip, is where the first carbon nanofibers 80 not forming the cell structures 300 in the adjacent cell structure assemblies 400 gather and join the cell structure assemblies 400 with the interface phase 30a surrounding the first carbon nanofibers 80.

The cell structure assemblies 400 and the tie structure 500 are believed to greatly affect the physical strength and the chemical strength (resistance to chemicals) of the composite elastomer 50. The cell structure assemblies 400 in the composite elastomer 50 occurs sparsely, and the number of first carbon nanofibers 80 in the tie structure 500 becomes smaller as shown in FIG. 7 when the content of the first carbon nanofibers 80 is small relative to the elastomer 30. The tie structure 500 thus has a smaller reinforcing effect than the cell structure 300. The physical strength and the chemical strength of the composite elastomer 50 can thus be improved by further reinforcing the tie structure 500.

A-3. Step (b)

In step (b), second carbon nanofibers are mixed with the composite elastomer to obtain a carbon fiber composite material. Step (b) may be performed with, for example, the open rolls 2, as shown in FIGS. 4 and 5. The open rolls 2 are as described in FIGS. 1 to 3, and have the same reference numerals used in these figures, and will not be described.

As shown in FIG. 4, a plurality of second carbon nanofibers 90 is supplied, and mixed with a bank 54 of the composite elastomer 50 from step (a) wound around the first roll 10. This produces a second mixture 56. The mixing method used in step (b) is not limited to the open-roll method, and may be, for example, an internal mixing method or a multi-screw extrusion kneading method. As shown in FIG. 5, the second mixture 56 is then tight-milled either once or multiple times with the open rolls 2 in the same manner as described for FIG. 3. This produces a carbon fiber composite material 60. The tight-mill conditions are as described for FIG. 3, and will not be described further. The second carbon nanofibers contained in the carbon fiber composite material 60 obtained in step (b) are defibrated as are the first carbon nanofibers, and are dispersed throughout the material. The tight-milling can further improve the dispersion uniformity of the second carbon nanofibers.

B. Carbon Fiber Composite Material

The carbon fiber composite material 60 obtained as above includes the cell structures 300 with the elastomer 30 surrounded by the first carbon nanofibers 80 and the interface phase 30a, the cell structure assemblies 400 as aggregates of the cell structures 300, and tie structures 510 joining the cell structure assemblies 400, as shown in FIG. 8. The tie structures 510 are formed by one or more first carbon nanofibers 80, one or more second carbon nanofibers 90, and the elastomer interface phase 30a surrounding these carbon nanofibers. The second carbon nanofibers 90 in the carbon fiber composite material 60 occur close to the first carbon nanofibers 80 in the tie structures 500 (see FIG. 7), and form a part of the tie structures 510 so as to reinforce the tie structures 500 (see FIG. 7).

After step (b), the cell structure assemblies 400 in the carbon fiber composite material 60 can maintain their form without being practically destroyed. During step (b), the second carbon nanofibers 90 come close to the tie structures 500 (see FIG. 7), and form a part of the tie structures 510. Around the second carbon nanofibers 90 is the interface phase 30a formed by the elastomer 30, and the interface phase 30a around the second carbon nanofibers 90 forms the tie structures 510 with the interface phase 30a formed around the first carbon nanofibers 80.

The second carbon nanofibers 90 reinforce the tie structures 510 to improve the physical strength and the chemical strength of the carbon fiber composite material 60. Specifically, the carbon fiber composite material 60 with the second carbon nanofibers 90 reinforcing the tie structures 510 can have high strength (for example, high tensile strength) and high rigidity (for example, rigidity in a tensile test) while remaining flexible.

B-1. Carbon Nanofibers

The first carbon nanofibers 80 and the second carbon nanofibers 90 may have an average diameter of 0.5 nm to 500 nm, 0.5 nm to 250 nm, or particularly 0.5 nm to 100 nm. Carbon nanofibers with an average diameter of 0.5 nm to 500 nm are commercially available, and may be used as the first carbon nanofibers 80 and the second carbon nanofibers 90, and processed according to the present embodiment. The first carbon nanofibers 80 and the second carbon nanofibers 90 may be selected from, for example, carbon nanofibers with an average diameter of 0.5 nm to 6 nm, 9 nm to 40 nm, and 60 nm to 500 nm. The carbon nanofibers with an average diameter of 0.5 nm to 6 nm may be carbon nanofibers with an average diameter of 2 nm to 6 nm. The carbon nanofibers with an average diameter of 9 nm to 40 nm may be carbon nanofibers with an average diameter of 9 nm to 20 nm. The carbon nanofibers with an average diameter of 60 nm to 500 nm may be carbon nanofibers with an average diameter of 60 nm to 100 nm.

The average diameters of the first carbon nanofibers 80 and the second carbon nanofibers 90 are the outer diameters of the fibers. The first carbon nanofibers 80 and the second carbon nanofibers 90 may be straight or curved. The average diameters of the first carbon nanofibers 80 and the second carbon nanofibers 90 may be obtained as the arithmetic mean values of diameters measured at at least 200 points in, for example, an electron micrograph at 5,000 times magnification (the magnification may be appropriately varied according to the size of the first carbon nanofibers).

The first carbon nanofibers 80 and the second carbon nanofibers 90 may be carbon nanotubes, for example. The carbon nanotubes may be appropriately selected from a variety of carbon nanotubes, including single-walled carbon nanotubes (SWNTs) constructed from a rolled single graphite layer of a hexagonal carbon network, double-walled carbon nanotubes (DWNTs) constructed from two rolled layers, and multi-walled carbon nanotubes (MWNT) constructed from three or more rolled layers. Carbon materials with a partial carbon nanotube structure also may be used. Carbon nanotubes are also referred to as graphite fibril nanotubes, or vapor grown carbon fibers.

Single-walled carbon nanotubes and multi-walled carbon nanotubes are produced into a desired size by using methods such as an arc discharge method, a laser ablation method, and a vapor-phase growth method. The first carbon nanofibers may be subjected to a surface treatment, for example, such as an ion-injection treatment, a sputter-etching treatment, and a plasma treatment before being mixed with the elastomer to improve the adhesion and wettability for the elastomer.

The first carbon nanofibers 80 and the second carbon nanofibers 90 may have different average diameters.

B-2. First CNF<Second CNF

The first carbon nanofibers 80 may have a smaller average diameter than the second carbon nanofibers 90.

When the average diameter of the first carbon nanofibers 80 is 0.5 nm to 500 nm, the cell structure assemblies 400 may have an average diameter of 0.02 µm to 30 µm, and the tie structures 500 may have an average diameter of 5 nm to 10 µm.

The size of the cell structure assemblies 400 and the tie structures 500 may be determined after calculation by eluting the elastomer from an uncrosslinked carbon fiber composite material dipped in a solvent, for example, such as toluene, and observing and measuring the remaining structure with a scanning electron microscope (SEM) or a transmission electron microscope (TEM) at, for example, 5,000 times magnification. The average diameter of the cell structure assemblies 400 may be determined as the arithmetic mean value of, for example, at least 200 cell structure assemblies 400 after measuring the assumed unit particle of the cell structure assembly 400 of the cell structures 300 at different measurement points (for example, the maximum diameter at 4 or more measurement points along arbitrarily chosen directions of each unit particle of the cell structure assembly 400). Similarly, the average diameter of the tie structures 500 may be determined as the arithmetic mean value of diameters from, for example, 200 measurement points on the assumed unit fiber of the tie structure 500 observed in the same manner as for the cell structure assemblies 400.

For example, the average diameter of the first carbon nanofibers 80 may be 0.5 nm to 40 nm, and the average diameter of the second carbon nanofibers 90 may be 60 nm to 100 nm. When the average diameter of the first carbon nanofibers 80 is 0.5 nm to 40 nm, the first carbon nanofibers 80 may be mixed in 5 parts by mass to 40 parts by mass with respect to 100 parts by mass of the elastomer to establish cellulation, specifically to form the cell structure 300, the cell structure assembly 400, and the tie structure 500. The second carbon nanofibers 90 may be mixed in 1 part by mass to 10 parts by mass with respect to 100 parts by mass of the elastomer to reinforce the tie structure 500. Specifically, the first carbon nanofibers 80 may be 5 parts by mass to 15 parts by mass with respect to 100 parts by mass of the elastomer when the elastomer is a high specific gravity elastomer (for example, fluororubber (FKM); described later). This is because the high specific gravity of the elastomer makes the volume proportion of the first carbon nanofibers 80 large even when the first carbon nanofibers 80 are contained in small amounts. The second carbon nanofibers 90 are contained in relatively smaller amounts, and may have about the same content (1 part by mass to 10 parts by mass) even for a high specific gravity elastomer.

When the first carbon nanofibers 80 and the second carbon nanofibers 90 have average diameters of 0.5 nm to 40 nm and 60 nm to 100 nm, respectively, the cell structure assemblies 400 may have an average diameter of 0.02 µm to 2 µm, and the tie structures 500 may have an average diameter of 65 nm to 2 µm.

For example, the first carbon nanofibers 80 may have an average diameter of 2 nm to 6 nm, and the second carbon nanofibers 90 may have an average diameter of 60 nm to 100 nm. For example, the first carbon nanofibers 80 may have an average diameter of 2 nm to 6 nm, and the second carbon nanofibers 90 may have an average diameter of 9 nm to 20 nm.

A high-strength and high-rigidity carbon fiber composite material can be obtained when the first carbon nanofibers 80 have a smaller average diameter than the second carbon nanofibers 90, though the carbon fiber composite material becomes less flexible in this case.

B-3. First CNF>Second CNF

The first carbon nanofibers 80 may have a larger average diameter than the second carbon nanofibers 90.

For example, the average diameter of the first carbon nanofibers 80 may be 60 nm to 100 nm, and the average diameter of the second carbon nanofibers 90 may be 0.5 nm to 40 nm. When the average diameter of the first carbon nanofibers 80 is 60 nm to 100 nm, the first carbon nanofibers 80 may be mixed in 20 parts by mass to 60 parts by mass with respect to 100 parts by mass of the elastomer to establish cellulation, specifically to form the cell structure 300, the cell structure assembly 400, and the tie structure 500. The second carbon nanofibers 90 may be mixed in 1 part by mass to 10 parts by mass with respect to 100 parts by mass of the elastomer to reinforce the tie structure 500. Specifically, the first carbon nanofibers 80 may be 20 parts by mass to 35 parts by mass with respect to 100 parts by mass of the elastomer when the elastomer is a high specific gravity elastomer. The second carbon nanofibers 90 are contained in relatively smaller amounts, and may have about the same content (1 part by mass to 10 parts by mass) even for a high specific gravity elastomer.

When the first carbon nanofibers 80 and the second carbon nanofibers 90 have average diameters of 60 nm to 100 nm and 0.5 nm to 40 nm, respectively, the cell structure assemblies 400 may have an average diameter of 3 μm to 10 μm, and the tie structures 500 may have an average diameter of 65 nm to 2 μm.

For example, the first carbon nanofibers 80 may have an average diameter of 60 nm to 100 nm, and the second carbon nanofibers 90 may have an average diameter of 2 nm to 6 nm. For example, the first carbon nanofibers 80 may have an average diameter of 9 nm to 20 nm, and the second carbon nanofibers 90 may have an average diameter of 2 nm to 6 nm.

A carbon fiber composite material of improved strength and rigidity can be obtained while maintaining high flexibility when the first carbon nanofibers 80 have a larger average diameter than the second carbon nanofibers 90.

As used herein, "parts by mass" means "phr", unless otherwise stated. The abbreviation phr stands for "parts per hundred of resin or rubber", and represents the outer percentage of additives or other components with respect to rubber or the like.

The first carbon nanofibers 80 and the second carbon nanofibers 90 may have the same average diameter.

B-4. Elastomer

At least one of the main chain, the side chain, and the terminal chain of the elastomer used in step (a) may have an unsaturated bond or a group having affinity to terminal radicals of the first carbon nanofibers, or the elastomer may have a property to readily generate such radicals or groups. The unsaturated bond or the group may be at least one selected from functional groups such as a double bond, a triple bond, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The first carbon nanofibers and the second carbon nanofibers have a closed structure with the five-membered rings introduced at the ends, and readily generate radicals and functional groups. The elastomer molecules can bind to the first and second carbon nanofibers with the unsaturated bond or the group having affinity (reactivity or polarity) to terminal radicals of the first and second carbon nanofibers, formed on at least one of the main chain, the side chain, and the terminal chain of the elastomer molecules. This enables the first and second carbon nanofibers to easily disperse by overcoming the force acting to aggregate these fibers. Presumably, the free radicals resulting from the cut molecular chains of the elastomer attack defects of the first and second carbon nanofibers, and generate radicals on the surfaces of the first and second carbon nanofibers upon mixing the elastomer and the first and second carbon nanofibers.

Examples of the elastomer include elastomers such as natural rubber (NR), epoxidized natural rubber (ENR), styrene-butadiene rubber (SBR), nitrile rubber (NBR), chloroprene rubber (CR), ethylene propylene rubber (EPR, EPDM), butyl rubber (IIR), chlorobutyl rubber (CIIR), acryl rubber (ACM), silicone rubber (Q), fluororubber (FKM), butadiene rubber (BR), epoxidized butadiene rubber (EBR), epichlorohydrin rubber (CO, CEO), urethane rubber (U), and polysulfide rubber (T); thermoplastic elastomers such as an olefin-based elastomer (TPO), a polyvinyl chloride-based elastomer (TPVC), a polyester-based elastomer (TPEE), a polyurethane-based elastomer (TPU), a polyamide-based elastomer (TPEA), and a styrene-based elastomer (SBS); and mixtures of these. The elastomer may be a rubber elastomer or a thermoplastic elastomer. In the case of a rubber elastomer, the elastomer may be of uncrosslinked form.

The elastomer can appropriately adjust the filler content with its specific gravity. In the case of a high specific gravity elastomer, the volume proportion of the filler increases even when the content in parts by mass is small. Specifically, it is possible to grasp the required mixing amounts, in pars by mass, by comparing how much of the volume of the carbon fiber composite material is occupied by structures such as the cell structure assemblies with different elastomers. For example, a high specific gravity elastomer may have a specific gravity of 1.5 g/cm$^3$ or more. A fluororubber (FKM) represents an example of such a high specific gravity elastomer. In a carbon fiber composite material using a fluororubber, the cell structure assembly and the tie structure have relatively large proportions in the carbon fiber composite material in terms of a volume based on specific gravity even when these are actually mixed in small amounts by mass.

B-5. Pulsed NMR Technique

The carbon fiber composite material may have a first spin-spin relaxation time (T2n) of 100 to 3000 μs, and the fraction (fnn) of components with a second spin-spin relaxation time may be 0 to 0.2 as measured in uncrosslinked form for the observed nucleus $^1$H at 150° C. by using a pulsed NMR technique according to the Hahn-echo method. The fraction (fnn) of components with a second spin-spin relaxation time (T2nn) is smaller in the carbon fiber composite material than in a composite elastomer.

The carbon fiber composite material 60 may have a first spin-spin relaxation time (T2n) of 100 to 3000 μs, and the fraction (fnn) of components with a second spin-spin relaxation time may be 0 to 0.2 as measured in uncrosslinked form for the observed nucleus $^1$H at 150° C. by using a pulsed NMR technique according to the Hahn-echo method. The T2n and fnn of the carbon fiber composite material 60 at 150° C. can be described as a state in which the first and second carbon nanofibers 80 and 90 are dispersed in the matrix elastomer 30 in defibrated form, and in which the molecules of the elastomer 30 are restrained by the first and second carbon nanofibers 80 and 90 in the cell structure 300 and the tie structure 510. In this state, the mobility of the elastomer molecules restrained by the first and second carbon nanofibers 80 and 90 is smaller than in the case where the elastomer is not restrained by the first and second carbon nanofibers 80 and 90. The first spin-spin relaxation time (T2n), the second spin-spin relaxation time (T2nn), and the spin-lattice relaxation time (T1) of the carbon fiber composite material 60 are accordingly shorter than in the case where the elastomer does not contain the first and second carbon nanofibers 80 and 90, particularly when the cell structures 300 and the tie structures 510 are formed. In the state in which the molecules of the elastomer 30 are restrained by the first and second carbon nanofibers 80 and 90, the non-network component (non-reticulate chain component) of the elastomer molecules are believed to decrease for the following reasons. Specifically, the overall decrease in the molecular mobility of the elastomer due to the first and second carbon nanofibers 80 and 90 makes the non-network component less mobile and behave like the network component. Another reason is that the non-network component (terminal chain), which is more mobile, is more likely to be adsorbed at the active sites of the first and second carbon nanofibers 80 and 90. All this appear to decrease the non-network component. Because fn+fnn=1, the fraction (fnn) of components with a second spin-spin relaxation time (T2nn) is smaller than in the case where the elastomer does not contain the first and second carbon nanofibers 80 and 90. It can thus be said that the first and second carbon nanofibers 80 and 90 are uniformly dispersed in the composite elastomer when the measured values obtained by using a pulsed NMR technique according to the Hahn-echo method fall in the foregoing ranges.

B-6. Effects

The crosslinked carbon fiber composite material obtained as above can have high strength and high rigidity while maintaining flexibility. The carbon fiber composite material also can have high heat resistance, flexibility and abrasion resistance.

The crosslinked carbon fiber composite material obtained as above has a smaller creep instantaneous strain (%) and a smaller creep rate (ppm/h) than a carbon fiber composite material mixed with only the first carbon nanofibers. The crosslinked carbon fiber composite material obtained as above also has a longer tear fatigue life than a carbon fiber composite material mixed with only the first carbon nanofibers.

Compounding ingredients used in common elastomer processing may be used in the carbon fiber composite material producing method described above. The compounding ingredients may be known compounding ingredients. Examples include crosslinking agents, vulcanizing agents, vulcanization accelerators, vulcanization retarders, softeners, plasticizers, curing agents, reinforcing agents, fillers, aging preventives, colorants, and acid acceptors. These compounding ingredients may be supplied to the elastomer at an appropriate timing during the mixing procedure.

While there has been described a certain embodiment of the invention, it will be understood by a skilled person that various modifications may be made thereto, provided that such changes do not substantively depart from the novel features and the effects of the invention. It is intended that all such modifications fall within the scope of the invention.

EXAMPLE 1

Examples of the present invention are described below. The present invention, however, is not limited by the following Examples.

(1-1) Sample Production

First Step:

A ternary fluorine-containing elastomer of Table 1 ("FKM" in Table 1; 100 parts by mass (phr)) was supplied to open rolls with a roll diameter of 6 inches (roll temperature 10 to 20° C.), and wrapped around the rolls.

Second Step:

A first carbon nanofiber of Table 1 ("MWCNT-1" in Table 1) was supplied as a compounding ingredient in the amount (parts by mass (phr)) presented in Table 1. The roll distance was 1.5 mm.

Third Step:

After the compounding ingredient was supplied, a first mixture containing the compounding ingredient was removed from the rolls.

Fourth Step:

The first mixture was supplied, and tight-milled with the rolls at a reduced roll distance of 0.3 mm from 1.5 mm. The surface velocity ratio of the two rolls was 1.1, and the tight-milling was repeated 10 times.

Fifth Step:

A second carbon nanofiber ("MWCNT-2" in Table 1) was supplied as a compounding ingredient in the amount (parts by mass (phr)) presented in Table 1. The roll distance was 1.5 mm.

Sixth Step:

After the compounding ingredient was supplied, a second mixture containing the compounding ingredient was removed from the rolls.

Seventh Step:

The second mixture was supplied, and tight-milled with the rolls at a reduced roll distance of 0.3 mm from 1.5 mm. The surface velocity ratio of the two rolls was 1.1, and the tight-milling was repeated 10 times.

Eighth Step:

The tight-milled composite material was supplied to the rolls maintained at a predetermined distance (1.1 mm), and sheeted to obtain an uncrosslinked elastomer composition.

Ninth Step:

The uncrosslinked elastomer composition was charged into a mold, and compression molded (cured) at 160° C. for 10 minutes. After the post-curing performed at 230° C. for 4 hours, a carbon fiber composite material sample of Example 1 was obtained.

In Table 1, "MWCNT-1" is a multi-walled carbon nanotube (first carbon nanofiber) with an average diameter (arithmetic mean value of measurement values taken at at least 200 measurement points in a scanning electron micrograph) of 18 nm, "MWCNT-2" is a multi-walled carbon nanotube (second carbon nanofiber) with an average diameter (arithmetic mean value of measurement values taken at at least 200 measurement points in a scanning electron micrograph) of 68 nm, and "FKM" is a ternary FKM with a moony viscosity $ML_{1+4}$ 121° C. (median) of 53. Though not shown in Table 1, components such as peroxide (crosslinking agent) and a processing aid were mixed as compounding ingredients other than the multi-walled carbon nanotubes. The mixed proportions of the compounding ingredients in Tables 1 to 6 are presented in parts by mass (phr) with respect to 100 parts by mass (phr) of the elastomer, and in volume percent (vol %) with respect to 100 volume % of the carbon fiber composite material, as indicated on the left and right, respectively, of the cells to the right of the heading "Mixture".

Comparative Example 1 is a sample mixed with only the first carbon nanofiber ("MWCNT-1"). The sample was produced without fifth step to seventh step.

(1-2) Measurement by Pulsed NMR Technique

The uncrosslinked samples of Example 1 and Comparative Example 1 were measured by using a pulsed NMR technique according to the Hahn-echo method. The measurement was performed with the JEOL product JMN-MU25 for the observed nucleus $^1$H at a resonance frequency of 25 MHz and a 90° pulse width of 2 μs. From a decay curve created at the Hahn-echo pulse sequence (90° x-Pi-180° y), the characteristic relaxation time (T2/150° C.) and the fraction (fnn) of components with a second spin-spin relaxation time (T2nn/150° C.) of the composite material sample at 150° C. were determined. The relaxation time was 600 to 1000 μs, and the fraction (fnn) of components with a second spin-spin relaxation time (T2nn) was less than 0.2 for the uncrosslinked elastomer composition samples of Example 1 and Comparative Example 1.

(1-3) Basic Property Test

The samples of Example 1 and Comparative Example 1 were measured for rubber hardness (Hs (JIS A)) in a JIS K6253 test.

The samples of Example 1 and Comparative Example 1 were measured for tensile strength (TS (MPa)), elongation at break (Eb (%)), and stress at 50% deformation (σ50 (MPa)) in a JIS K6252 tensile test conducted with a Shimadzu tensile tester at 23±2° C. and a 500 mm/min tensile rate, using a JIS6 dumbbell shaped test piece prepared from each sample.

The measurement results are presented in Table 1.

(1-4) Creep Test

The samples of Example 1 and Comparative Example 1 were measured for creep instantaneous strain (%) and hourly creep rate in a steady creep period (ppm/h) in a 15-hour thermal creep test conducted at 200° C. under a 3 MPa load. Creep instantaneous strain is the instantaneous elongation under a 3 MPa load. Creep rate is the amount of strain change per hour in a steady creep period following the creep instantaneous strain and preceding the accelerated creep period (1 ppm=0.0001%). The results are presented in Table 1.

(1-5) Tear Fatigue Test

A tear fatigue test was conducted for strip-shaped test pieces measuring 10 mm in length, 4 mm in width, and 1 mm in thickness prepared from the samples of Example 1 and Comparative Example 1. In the test, each test piece was cut 1 mm deep along the width direction from the center relative to the longer side of the strip, and repeatedly placed under a tensile load (0 N/mm to 2.5 N/mm) in the atmosphere under 200° C., 2.5 N/mm maximum tensile stress, and 1 Hz frequency conditions using an SII TMA/SS6100 tester. In order to measure the tear fatigue life (number of times), each test piece was pulled at most 100,000 times until it broke. The entry "100,000 (discontinued)" in the table means that the test piece did not break even after being pulled 100,000 times. The results are presented in Table 1.

TABLE 1

|  |  | Example 1 | Comparative Example 1 |
|---|---|---|---|
| Mixture | FKM (phr/vol %) | 100/83.1 | 100/86.8 |
|  | MWCNT-1 (phr/vol %) | 15/12.7 | 15/13.2 |
|  | MWCNT-2 (phr/vol %) | 5/4.2 | 0 |
| Measurement results of crosslinked sample | Hs (JISA) | 87 | 84 |
|  | TS (MPa) | 30.5 | 26.0 |
|  | Eb (%) | 95 | 98 |
|  | σ50 (MPa) | 17.0 | 12.0 |
| Creep 200° C. 3 MPA | Creep instantaneous strain (%) | 20.0 | 22.5 |
|  | Creep rate (ppm/hr) | 2,000 | 2,800 |
| Tear fatigue 200° C. 2.5 N/mm | Tear fatigue life (number of times) | 100,000 (discontinued) | 34,600 |

As can be seen from the results presented in Table 1, the carbon fiber composite material sample of Example 1 had improved strength (TS) and rigidity (σ50) over the sample of Comparative Example 1 while maintaining substantially the same level of elongation at break (Eb). It can also be seen from the results presented in Table 1 that the carbon fiber composite material sample of Example 1 had a smaller creep instantaneous strain and a smaller creep rate, and a longer tear fatigue life than the sample of Comparative Example 1.

(1-6) Electron Microscope Observation

The sample of Comparative Example 1 was observed with a transmission electron microscope (hereinafter, "TEM") to obtain a three-dimensional image.

Specifically, in order to enable TEM and 3D-TEM observation, the sample was processed into a thickness of about 100 nm under cooled conditions with a focused ion beam (FIB) device (JEM-9310 FIB; JEOL Ltd., Japan).

The 100-nm sample was tilted in a ±70° angle range (1° intervals) in a JEOL TEM (JEM 2200 FS), and a transmission image was obtained at each tilt angle. These transmission images were than reconstructed into a three-dimensional image by computer tomography (CT).

Figure 9:
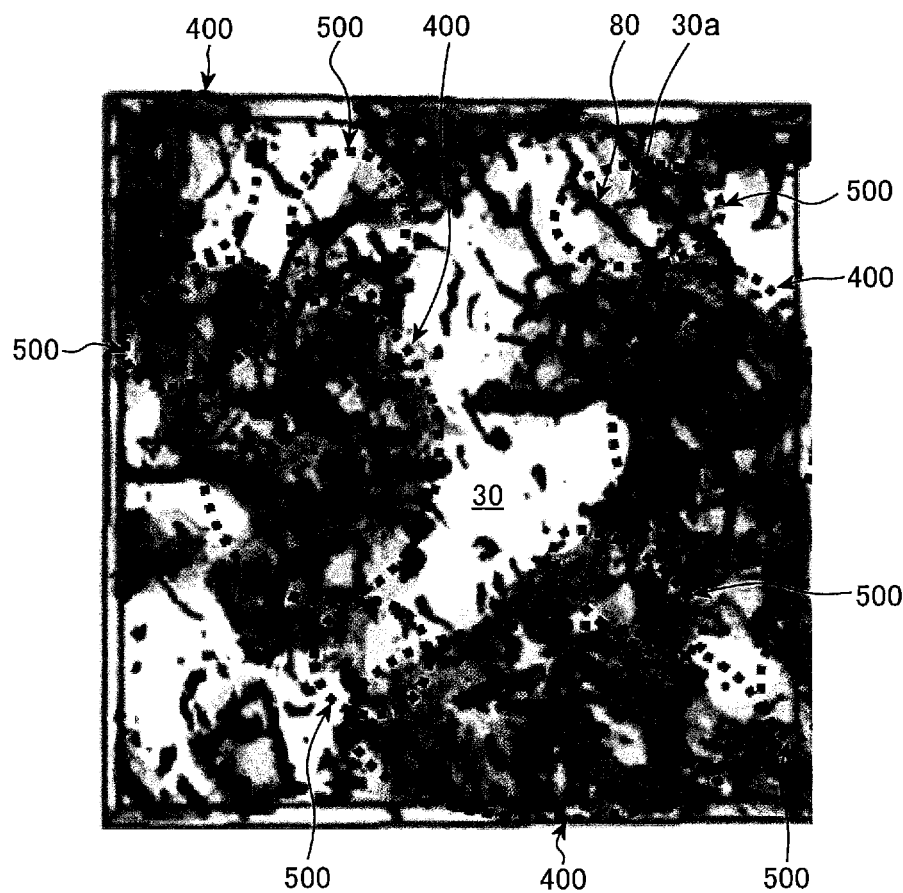
FIG. 9 is a three-dimensional view of a sample of Comparative Example 1 observed under a transmission electron microscope.

FIG. 9 shows the three-dimensional image. In FIG. 9, the white areas are the ternary fluorine-containing elastomer (indicated by reference numeral 30), the areas circled with light broken lines are the cell structure assemblies 400, and the areas circled with dark-colored broken lines are the tie structures 500. The fibrous first carbon nanofibers 80, and the interface phase 30a shown as pale grey portions around the first carbon nanofibers 80 were observed in the cell structure assemblies 400 and the tie structures 500.

EXAMPLE 2

(2-1) Sample Production

First Step:

A ternary fluorine-containing elastomer of Table 2 ("FKM" in Table 2; 100 parts by mass (phr)) was supplied to open rolls with a roll diameter of 6 inches (roll temperature 10 to 20° C.), and wrapped around the rolls.

Second Step:

A first carbon nanofiber of Table 2 ("MWCNT-2" in Table 2) was supplied as a compounding ingredient in the amount (parts by mass (phr)) presented in Table 2. The roll distance was 1.5 mm.

Third Step:

After the compounding ingredient was supplied, a first mixture containing the compounding ingredient was removed from the rolls.

Fourth Step:

The first mixture was supplied, and tight-milled with the rolls at a reduced roll distance of 0.3 mm from 1.5 mm. The surface velocity ratio of the two rolls was 1.1, and the tight-milling was repeated 10 times.

Fifth Step:

A second carbon nanofiber ("MWCNT-1" in Table 2) was supplied as a compounding ingredient in the amount (parts by mass (phr)) presented in Table 2. The roll distance was 1.5 mm.

Sixth Step:

After the compounding ingredient was supplied, a second mixture containing the compounding ingredient was removed from the rolls.

Seventh Step:

The second mixture was supplied, and tight-milled with the rolls at a reduced roll distance of 0.3 mm from 1.5 mm. The surface velocity ratio of the two rolls was 1.1, and the tight-milling was repeated 10 times.

Eighth Step:

The tight-milled composite material was supplied to the rolls maintained at a predetermined distance (1.1 mm), and sheeted to obtain an uncrosslinked elastomer composition.

Ninth Step:

The uncrosslinked elastomer composition was charged into a mold, and compression molded (cured) at 160° C. for 10 minutes. After the post-curing performed at 230° C. for 4 hours, a carbon fiber composite material sample of Example 2 was obtained.

In Table 2, "MWCNT-1" is a multi-walled carbon nanotube (first carbon nanofiber) with an average diameter (arithmetic mean value of measurement values taken at at least 200 measurement points in a scanning electron micrograph)

of 18 nm, "MWCNT-2" is a multi-walled carbon nanotube (second carbon nanofiber) with an average diameter (arithmetic mean value of measurement values taken at at least 200 measurement points in a scanning electron micrograph) of 68 nm, and "FKM" is a ternary FKM with a moony viscosity $ML_{1+4}$ 121° C. (median) of 53. Though not shown in Table 2, components such as peroxide (crosslinking agent) and a processing aid were mixed as compounding ingredients other than the multi-walled carbon nanotubes.

Comparative Example 2 is a sample mixed with only the first carbon nanofiber ("MWCNT-2"). The sample was produced without fifth step to seventh step.

(2-2) Measurement by Pulsed NMR Technique

The uncrosslinked samples of Example 2 and Comparative Example 2 were measured by using a pulsed NMR technique according to the Hahn-echo method. The measurement was performed with the JEOL product JMN-MU25 for the observed nucleus $^1H$ at a resonance frequency of 25 MHz and a 90° pulse width of 2 μs. From a decay curve created at the Hahn-echo pulse sequence (90° x-Pi-180° y), the characteristic relaxation time (T2/150° C.) and the fraction (fnn) of components with a second spin-spin relaxation time (T2nn/150° C.) of the composite material sample at 150° C. were determined. The relaxation time was 600 to 1000 μs, and the fraction (fnn) of components with a second spin-spin relaxation time (T2nn) was less than 0.2 for the uncrosslinked elastomer composition samples of Example 2 and Comparative Example 2.

(2-3) Basic Property Test

The samples of Example 2 and Comparative Example 2 were measured for rubber hardness (Hs (JIS A)) in a JIS K6253 test.

The samples of Example 2 and Comparative Example 2 were measured for tensile strength (TS (MPa)), elongation at break (Eb (%)), and stress at 50% deformation (σ50 (MPa)) in a JIS K6252 tensile test conducted with a Shimadzu tensile tester at 23±2° C. and a 500 mm/min tensile rate, using a JIS6 dumbbell shaped test piece prepared from each sample.

The measurement results are presented in Table 2.

(2-4) Creep Test

The samples of Example 2 and Comparative Example 2 were measured for creep instantaneous strain (%) and hourly creep rate in a steady creep period (ppm/h) in the same manner as in (1-4). The results are presented in Table 2.

(2-5) Tear Fatigue Test

A tear fatigue test was conducted for the samples of Example 2 and Comparative Example 2 in the same manner as in (1-5). In order to measure the tear fatigue life (number of times), each sample was pulled at most 100,000 times until it broke. The results are presented in Table 2.

TABLE 2

| | | Example 2 | Comparative Example 2 |
|---|---|---|---|
| Mixture | FKM (phr/vol %) | 100/76.6 | 100/79.7 |
| | MWCNT-2 (phr/vol %) | 25/19.5 | 25/20.3 |
| | MWCNT-1 (phr/vol %) | 5/3.9 | 0 |
| Measurement results of crosslinked sample | Hs (JISA) | 87 | 83 |
| | TS (MPa) | 24.0 | 22.5 |
| | Eb (%) | 110 | 115 |
| | σ50 (MPa) | 9.7 | 8.5 |

TABLE 2-continued

| | | Example 2 | Comparative Example 2 |
|---|---|---|---|
| Creep 200° C. 3 MPa | Creep instantaneous strain (%) | 21.0 | 23.4 |
| | Creep rate (ppm/hr) | 2,600 | 3,800 |
| Tear fatigue 200° C. 2.5 N/mm | Tear fatigue life (number of times) | 100,000 (discontinued) | 1,250 |

As can be seen from the results presented in Table 2, the carbon fiber composite material sample of Example 2 had improved strength (TS) and rigidity (σ50) over the sample of Comparative Example 2 while maintaining substantially the same level of elongation at break (Eb). It can also be seen from the results presented in Table 2 that the carbon fiber composite material sample of Example 2 had a smaller creep instantaneous strain and a smaller creep rate, and a longer tear fatigue life than the sample of Comparative Example 2.

EXAMPLES 3 TO 6

(3-1) Sample Production
First Step:
A ternary fluorine-containing elastomers of Tables 3 to 6 ("FKM" in Tables 3 to 6; 100 parts by mass (phr)) were supplied to open rolls with a roll diameter of 6 inches (roll temperature 10 to 20° C.), and wrapped around the rolls.
Second Step:
First carbon nanofibers of Tables 3 to 6 ("MWCNT-1" in Table 3, "SWCNT-1" in Table 4, "MWCNT-2" in Table 5, and "SWCNT-1" in Table 6) were supplied as compounding ingredients in the amounts (parts by mass (phr)) presented in Tables 3 to 6. The roll distance was 1.5 mm.
Third Step:
After the compounding ingredient was supplied, a first mixture containing the compounding ingredient was removed from the rolls.
Fourth Step:
The first mixture was supplied, and tight-milled with the rolls at a reduced roll distance of 0.3 mm from 1.5 mm. The surface velocity ratio of the two rolls was 1.1, and the tight-milling was repeated 10 times.
Fifth Step:
Second carbon nanofibers ("SWCNT-1" in Table 3, "MWCNT-1" in Table 4, "SWCNT-1" in Table 5, and "MWCNT-2" in Table 6) were supplied as compounding ingredients in the amounts (parts by mass (phr)) presented in Tables 3 to 6. The roll distance was 1.5 mm.
Sixth Step:
After the compounding ingredient was supplied, a second mixture containing the compounding ingredient was removed from the rolls.
Seventh Step:
The second mixture was supplied, and tight-milled with the rolls at a reduced roll distance of 0.3 mm from 1.5 mm. The surface velocity ratio of the two rolls was 1.1, and the tight-milling was repeated 10 times.
Eighth Step:
The tight-milled composite material was supplied to the rolls maintained at a predetermined distance (1.1 mm), and sheeted to obtain an uncrosslinked elastomer composition.
Ninth Step:
The uncrosslinked elastomer composition was charged into a mold, and compression molded (cured) at 160° C. for 10 minutes. After the post-curing performed at 230° C. for 4 hours, carbon fiber composite material samples of Examples 3 to 6 were obtained.

In Tables 3 to 6, "MWCNT-1" is a multi-walled carbon nanotube with an average diameter (arithmetic mean value of measurement values taken at at least 200 measurement points in a scanning electron micrograph) of 18 nm, "MWCNT-2" is a multi-walled carbon nanotube with an average diameter (arithmetic mean value of measurement values taken at at least 200 measurement points in a scanning electron micrograph) of 68 nm, "SWCNT-1" is a single-walled carbon nanotube with an average diameter (arithmetic mean value of measurement values taken at at least 200 measurement points in a scanning electron micrograph) of 5 nm, and "FKM" is a ternary FKM with a moony viscosity $ML_{1+4}$ 121° C. (median) of 53. Though not shown in Tables 3 to 6, components such as peroxide (crosslinking agent) and a processing aid were mixed as compounding ingredients other than the single-walled carbon nanotube and the multi-walled carbon nanotubes.

Comparative Examples 1 and 2 are the same as in Tables 1 and 2, and Comparative Example 3 is a sample mixed with only the first carbon nanofiber ("SWCNT-1"). The samples were produced without fifth step to seventh step.

(3-2) Basic Property Test

The samples of Examples 3 to 6 and Comparative Examples 1 to 3 were measured for rubber hardness (Hs (JIS A)) in a JIS K6253 test.

The samples of Examples 3 to 6 and Comparative Examples 1 to 3 were measured for tensile strength (TS (MPa)), elongation at break (Eb (%)), and stress at 50% deformation (σ50 (MPa)) in a JIS K6252 tensile test conducted with a Shimadzu tensile tester at 23±2° C. and a 500 mm/min tensile rate, using a JIS6 dumbbell shaped test piece prepared from each sample.

The measurement results are presented in Tables 3 to 6.

(3-3) Creep Test

The samples of Examples 3 to 6 and Comparative Examples 1 to 3 were measured for creep instantaneous strain (%) and hourly creep rate in a steady creep period (ppm/h) in the same manner as in (1-4). The results are presented in Tables 3 to 6.

(3-4) Tear Fatigue Test

A tear fatigue test was conducted for the samples of Examples 3 to 6 and Comparative Examples 1 to 3 in the same manner as in (1-5). In order to measure the tear fatigue life (number of times), each sample was pulled at most 100,000 times until it broke. The results are presented in Tables 3 to 6.

TABLE 3

| | | Example 3 | Comparative Example 1 |
|---|---|---|---|
| Mixture | FKM (phr/vol %) | 100/84.5 | 100/86.8 |
| | MWCNT-1 (phr/vol %) | 15/12.9 | 15/13.2 |
| | SWCNT-1 (phr/vol %) | 3/2.6 | 0 |
| Measurement results of crosslinked sample | Hs (JISA) | 87 | 84 |
| | TS (MPa) | 32.0 | 26.0 |
| | Eb (%) | 100 | 98 |
| | σ50 (MPa) | 17.4 | 12.0 |
| Creep 200° C. 3 MPa | Creep instantaneous strain (%) | 19.8 | 22.5 |
| | Creep rate (ppm/hr) | 1,940 | 2,800 |
| Tear fatigue 200° C. 2.5 N/mm | Tear fatigue life (number of times) | 100,000 (discontinued) | 34,600 |

TABLE 4

| | | Example 4 | Comparative Example 3 |
|---|---|---|---|
| Mixture | FKM (phr/vol %) | 100/88.3 | 100/90.8 |
| | SWCNT-1 (phr/vol %) | 10/9.0 | 10/9.2 |
| | MWCNT-1 (phr/vol %) | 3/2.7 | 0 |
| Measurement results of crosslinked sample | Hs (JISA) | 89 | 87 |
| | TS (MPa) | 29.5 | 27.0 |
| | Eb (%) | 97 | 105 |
| | σ50 (Mpa) | 16.0 | 13.7 |
| Creep 200° C. 3 MPa | Creep instantaneous strain (%) | 19.2 | 20.6 |
| | Creep rate (ppm/hr) | 1,720 | 1,950 |
| Tear fatigue 200° C. 2.5 N/mm | Tear fatigue life (number of times) | 100,000 (discontinued) | 83,000 |

TABLE 5

| | | Example 5 | Comparative Example 2 |
|---|---|---|---|
| Mixture | FKM (phr/vol %) | 100/77.8 | 100/79.7 |
| | MWCNT-2 (phr/vol %) | 25/19.8 | 25/20.3 |
| | SWCNT-1 (phr/vol %) | 3/2.4 | 0 |
| Measurement results of crosslinked sample | Hs (JISA) | 85 | 83 |
| | TS (MPa) | 25.0 | 22.5 |
| | Eb (%) | 120 | 115 |
| | σ50 (MPa) | 9.5 | 8.5 |
| Creep 200° C. 3 MPa | Creep instantaneous strain (%) | 21.5 | 23.4 |
| | Creep rate (ppm/hr) | 2,500 | 3,800 |
| Tear fatigue 200° C. 2.5 N/mm | Tear fatigue life (number of times) | 100,000 (discontinued) | 1,250 |

TABLE 6

| | | Example 6 | Comparative Example 3 |
|---|---|---|---|
| Mixture | FKM (phr/vol %) | 100/86.8 | 100/90.8 |
| | SWCNT-1 (phr/vol %) | 10/8.8 | 10/9.2 |
| | MWCNT-2 (phr/vol %) | 5/4.4 | 0 |
| Measurement results of crosslinked sample | Hs (JISA) | 88 | 87 |
| | TS (MPa) | 28.7 | 27.0 |
| | Eb (%) | 98 | 105 |
| | σ50 (MPa) | 14.9 | 13.7 |
| Creep 200° C. 3 MPa | Creep instantaneous strain (%) | 19.5 | 20.6 |
| | Creep rate (ppm/hr) | 1,800 | 1,950 |
| Tear fatigue 200° C. 2.5 N/mm | Tear fatigue life (number of times) | 100,000 (discontinued) | 83,000 |

As can be seen from the results presented in Table 3, the carbon fiber composite material sample of Example 3 had improved strength (TS) and rigidity (σ50) over the sample of Comparative Example 1 while maintaining substantially the same level of elongation at break (Eb). It can also be seen from the results presented in Table 3 that the carbon fiber composite material sample of Example 3 had a smaller creep instantaneous strain and a smaller creep rate, and a longer tear fatigue life than the sample of Comparative Example 1.

As can be seen from the results presented in Table 4, the carbon fiber composite material sample of Example 4 had improved strength (TS) and rigidity (σ50) over the sample of Comparative Example 3 while maintaining substantially the same level of elongation at break (Eb). It can also be seen from the results presented in Table 4 that the carbon fiber composite material sample of Example 4 had a smaller creep instantaneous strain and a smaller creep rate, and a longer tear fatigue life than the sample of Comparative Example 3.

As can be seen from the results presented in Table 5, the carbon fiber composite material sample of Example 5 had improved strength (TS) and rigidity (σ50) over the sample of Comparative Example 2 while maintaining substantially the same level of elongation at break (Eb). It can also be seen from the results presented in Table 5 that the carbon fiber composite material sample of Example 5 had a smaller creep instantaneous strain and a smaller creep rate, and a longer tear fatigue life than the sample of Comparative Example 2.

As can be seen from the results presented in Table 6, the carbon fiber composite material sample of Example 6 had improved strength (TS) and rigidity (σ50) over the sample of Comparative Example 3 while maintaining substantially the same level of elongation at break (Eb). It can also be seen from the results presented in Table 6 that the carbon fiber composite material sample of Example 6 had a smaller creep instantaneous strain and a smaller creep rate, and a longer tear fatigue life than the sample of Comparative Example 3.

REFERENCE SIGNS LIST

2 Open roll
10 First roll
20 Second roll
30 Elastomer
30a Interface phase
34 Bank
36 First mixture
50 First composite elastomer
54 Bank
56 Second mixture
60 Carbon fiber composite material
80 First carbon nanofiber
90 Second carbon nanofiber
300 Cell structure
400 Cell structure assembly
500, 510 Tie structure
V1, V2 Rotational speed

The invention claimed is:

1. A carbon fiber composite material comprising:
a plurality of cell structures with an elastomer surrounded by a first carbon nanofiber and an interface phase thereof;
a plurality of cell structure assemblies as assemblies of more than one of the cell structures; and
a plurality of tie structures that joins the cell structure assemblies to each other,
wherein the tie structures are formed by one or more first carbon nanofibers, one or more second carbon nanofibers, and an elastomer interface phase formed around the one or more first carbon nanofibers and the one or more second carbon nanofibers,
wherein the first carbon nanofibers have an average diameter of 60 nm to 500 nm, and are contained in an amount of 5 parts by mass to 60 parts by mass with respect to 100 parts by mass of the elastomer,
wherein the second carbon nanofibers have an average diameter of 0.5 nm to 40 nm, and are contained in an amount of 1 part by mass to 10 parts by mass with respect to 100 parts by mass of the elastomer,
wherein the cell structure assemblies have an average diameter of 0.02 µm to 30 µm, and
wherein the tie structures have an average diameter of 5 nm to 10 µm.

2. A carbon fiber composite material comprising:
a plurality of cell structures with an elastomer surrounded by a first carbon nanofiber and an interface phase thereof;
a plurality of cell structure assemblies as assemblies of more than one of the cell structures; and
a plurality of tie structures that joins the cell structure assemblies to each other,
wherein the tie structures are formed by one or more first carbon nanofibers, one or more second carbon nanofibers, and an elastomer interface phase formed around the one or more first carbon nanofibers and the one or more second carbon nanofibers,
wherein the first carbon nanofibers have an average diameter of 0.5 nm to 40nm, and are contained in an amount of 5 parts by mass to 40 parts by mass with respect to 100 parts by mass of the elastomer, and
wherein the second carbon nanofibers have an average diameter of 60 nm to 100 nm, and are contained in an amount of 1 part by mass to 10 parts by mass with respect to 100 parts by mass of the elastomer.

3. The carbon fiber composite material according to claim 2,
wherein the cell structure assemblies have an average diameter of 0.02 µm to 2 µm, and
wherein the tie structures have an average diameter of 65 nm to 2 µm.

4. The carbon fiber composite material according to claim 1,
wherein the first carbon nanofibers have an average diameter of 60 nm to 100nm, and are contained in an amount of 20 parts by mass to 60 parts by mass with respect to 100 parts by mass of the elastomer.

5. The carbon fiber composite material according to claim 4,
wherein the cell structure assemblies have an average diameter of 3 µm to 10 µm, and
wherein the tie structures have an average diameter of 65 nm to 2 µm.

6. A method for producing a carbon fiber composite material,
the method comprising the steps of:
(a) mixing a first carbon nanofiber with an elastomer, and tight-milling the mixture at 0° C. to 50° C. by using open rolls at a roll distance of 0.5 mm or less to obtain a composite elastomer; and
(b) mixing the composite elastomer with a second carbon nanofiber, and tight-milling the mixture at 0° C. to 50° C. by using open rolls at a roll distance of 0.5 mm or less to obtain the carbon fiber composite material,
wherein the first carbon nanofiber mixed in the step (a) has an average diameter of 0.5 nm to 40 nm, and is mixed in an amount of 5 parts by mass to 40 parts by mass with respect to 100 parts by mass of the elastomer, and
wherein the second carbon nanofiber mixed in the step (b) has an average diameter of 60 nm to 100 nm, and is mixed in an amount of 1 part by mass to 10 parts by mass with respect to 100 parts by mass of the elastomer.

7. A method for producing a carbon fiber composite material,
the method comprising the steps of:
(a) mixing a first carbon nanofiber with an elastomer, and tight-milling the mixture at 0° C. to 50° C. by using open rolls at a roll distance of 0.5 mm or less to obtain a composite elastomer; and
(b) mixing the composite elastomer with a second carbon nanofiber, and tight-milling the mixture at 0° C. to 50°

C. by using open rolls at a roll distance of 0.5 mm or less to obtain the carbon fiber composite material, wherein the first carbon nanofiber mixed in the step (a) has an average diameter of 60 nm to 100 nm, and is mixed in an amount of 20 parts by mass to 60 parts by mass with respect to 100 parts by mass of the elastomer, and wherein the second carbon nanofiber mixed in the step (b) has an average diameter of 0.5 nm to 40 nm, and is mixed in an amount of 1 part by mass to 10 parts by mass with respect to 100 parts by mass of the elastomer.

8. The carbon fiber composite material according to claim 1, wherein the cell structure assemblies have an average diameter of 0.02 μm to 2 μm, and wherein the tie structures have an average diameter of 65 nm to 2 μm.

9. The carbon fiber composite material according to claim 2, wherein the cell structure assemblies have an average diameter of 3μm to 10 μm, and wherein the tie structures have an average diameter of 65 nm to 2 μm.

\* \* \* \* \*